June 4, 1963  L. E. HARRISON  3,092,202
CONSTANT SPEED KEEPER FOR AUTOMOBILES
Filed Aug. 11, 1961  2 Sheets-Sheet 1

INVENTOR.
Lester E. Harrison
BY Scott L. Norvier

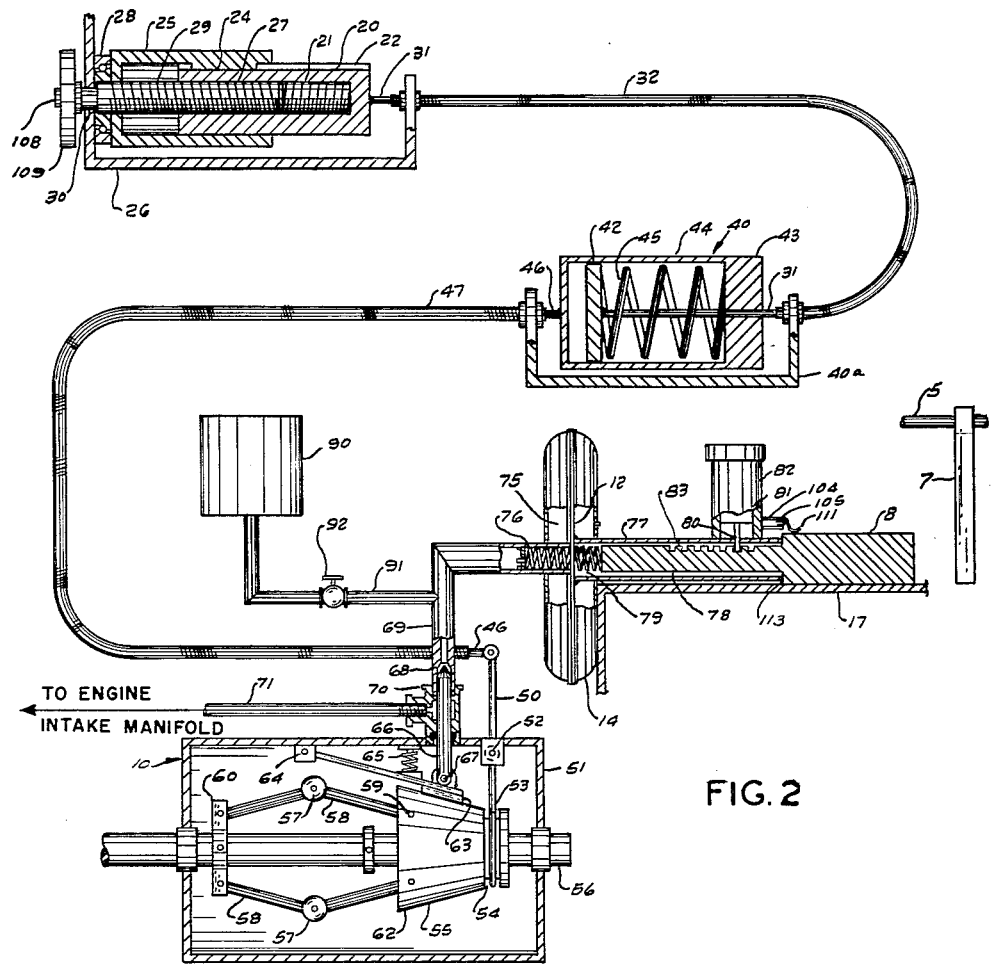

3,092,202
CONSTANT SPEED KEEPER FOR AUTOMOBILES
Lester E. Harrison, 717 W. 12th St., Casa Grande, Ariz.
Filed Aug. 11, 1961, Ser. No. 130,838
5 Claims. (Cl. 180—82.1)

This invention concerns a constant speed keeper for automobile engines or the like.

One of the objects of the invention is to provide a means, mechanism, and attachment parts which can be installed on a standard automobile and which will enable the driver to select a certain speed at which the car is desired to be driven and set the mechanism so that it will maintain the speed irrespective of winds, road conditions, and grades.

Another object is to provide mechanism which may be attached to a standard automobile having an internal combustion engine including a carburetor and throttle or its equivalent, as a driving means and electrical equipment for the ignition and the like, in combination with apparatus which can be attached to the driving mechanism and which will maintain the throttle opening sufficient to produce engine revolutions to drive the car at a predetermined speed irrespective of road and weather conditions.

Another object is to provide a means which will accomplish the above indicated results which is easily made and easily attached to the working parts of the engine carburetor and throttle and which may be operated by electrical means in the automobile and by controlled vacuum from the intake manifold of the automobile.

Still another object includes a governor means which may be driven from the automobile speedometer cable and which is used to determine and maintain a constant speed for the engine, as desired, and as set by a speed selecting device positioned within easy reach of the driver within the driving compartment of the automobile.

Another object is to provide a means of holding the throttle at a desired setting which will not compensate for windage or road inclinations, but due to the fixed throttle setting will give a better gas mileage. This feature is suitable on flat level country.

Other objects will appear hereinafter.

I attain the foregoing objects by means of the device, parts and combinations of parts shown in the accompanying drawing in which—

FIGURE 2 is a drawing of the mechanism used by me to maintain the engine throttle in a position to produce sufficient revolutions per minute to maintain the car at a predetermined speed;

FIGURE 3 is a drawing of a device installed on the dashboard of an automobile which will permit the driver of the car to select the speed he desires to travel or to disconnect hte device immediately when desired;

FIGURE 5 is a semi-diagrammatic perspective view of a brake pedal on an automobile to which the device here disclosed is attached.

Similar numerals refer to similar parts in the several views.

Figure 1:
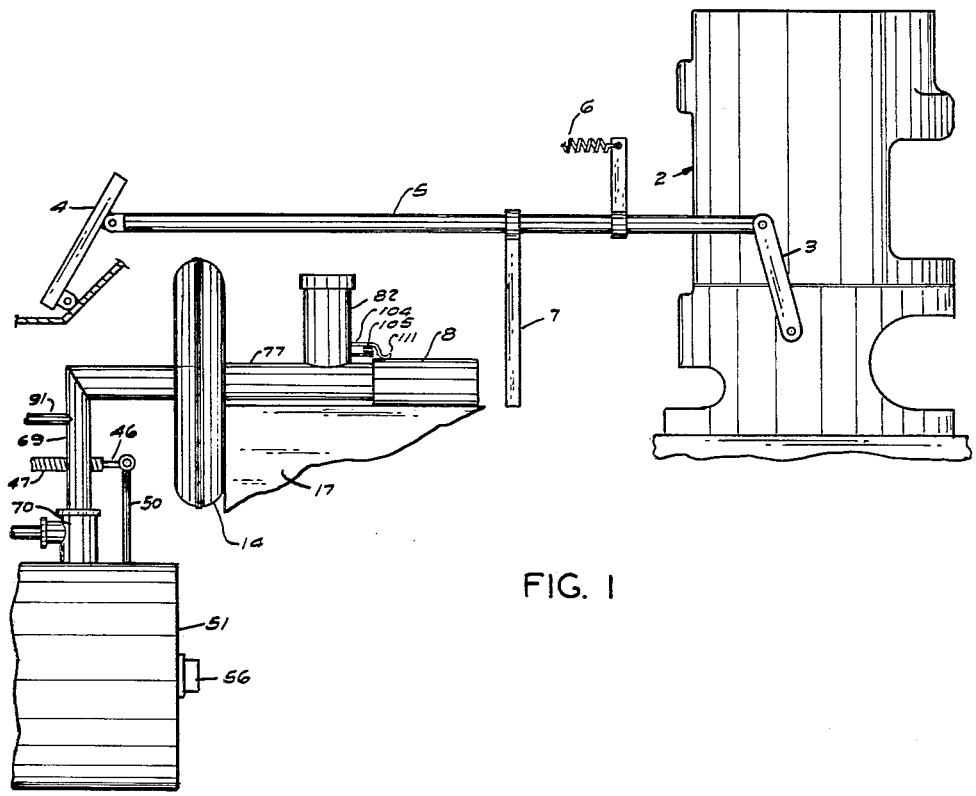
FIGURE 1 is a semi-diagrammatic drawing of the engine carburetor throttle and accelerator pedal together with my attachment which bears on the engine throttle and thereby maintains a desired speed.

In FIGURE 1 the engine carburetor is indicated by numeral 2 and the throttle lever by numeral 3. The throttle lever is connected to the foot accelerator 4 by a push rod 5. The throttle is resiliently maintained in a closed position by a spring 6 attached to the push rod 5. A lug 7 is attached to push rod 5 at a convenient position so that it may be maintained at a position which will hold the throttle open to a desired position. The lug 7 is contacted by a push plug 8 which is a part of the vacuum and electrical mechanism shown in detail in FIGURE 2.

In FIGURE 2 I show more in detail the vacuum and electrical mechanism. This mechanism is made up of a plug 8 which has a stem 78 on the rear. Stem 78 telescopes or slides in and out of sleeve 77 and has in its mid-portion a series of notches. On top of sleeve 77 is mounted a solenoid 82 with an armature 81 which has on its lower end a latch 80 which extends through sleeve 77 and engages the notches on stem 78. I show a diaphragm 12 in its case 14 with a compression spring 76. The diaphragm 12 is fastened to the rear of sleeve 77. To provide a mounting bracket for the mechanism and to hold the diaphragm case in line with the sleeve 77, I provide a bracket and support 17. As diaphragm 12 moves back and forth it moves sleeve 77, solenoid 82, stem 78 and plug 8 with it on support 17 as if they were one solid unit. At any time armature 81 and latch 80 are raised by energizing solenoid 82, spring 79 urges stem 78 out of sleeve 77 until plug 8 contacts lug 7. The positions of sleeve 77, stem 78, solenoid 82 and plug 8, acting as a unit are all controlled by the governor controlling the vacuum to diaphragm 12 and reacting against the force of the compression spring 76. The position of plug 8 with reference to lug 7 is initiated by the contact button 108 on the control apparatus shown in FIGURE 3. The governor is indirectly responsible for the position of plug 8 in that it is controlling the vacuum and as a result is controlling the position of diaphragm 12. The mechanism just described and shown in FIGURE 2 is installed in any convenient position near and parallel to the accelerator push rod 5 so that plug 8 can be in contact with lug 7 at any throttle position.

The regulating mechanism on the automobile dashboard, as shown in FIGURE 3, consists of a plunger nut 20 having an inner axial bore 21 which has an internal thread to screw onto threaded rod 27. Rod 27 is disposed to rotate in bearing 28 in the casing 25 and dashboard 26 and has a threaded shank 29 which will thread into the bore 21 of the nut 20. Nut part 20 has a longitudinally extending groove 22 on its outer surface which receives a key 24 on a cylindrical casing 25. This keeps the nut 20 from turning when rod 27 is turned. The casing 25 is attached to the dashboard 26 of the automobile in the front of the driving compartment. The rod 27 is provided with an annular groove 30 to prevent axial movement. Therefore, rotation of rod 27 will cause nut 20 to move axially. This motion is communicated to a stiff steel wire 31 operating in a flexible tubular shield 32. The wire and shield are led to a motion compensating device 40 which is attached to the body of the automobile within the engine compartment to maintatin it stationary. Stiff wire 31 communicates motion to the plunger disk 42 which is normally held outward away from the end 43 of the tubular case 44 by a spring 45. The case 44 is free to move axially within and relative to the supporting bracket 40A. When the case 44 moves it communicates longitudinal motion to the stiff wire 46 within the flexible casing 47. This motion is, in turn, communicated to a lever 50 which is on the cover housing 51 of the governor 10. The lever 50 is pivoted at 52 to the housing to provide a pivotal mount. The lower end of lever 50 is provided with a yoke 53 which rides in the annular groove 54 of a tapered sleeve 55 which slides on the governor shaft 56 and which is moved axially by fly balls 57 supported by levers 58. The ends 59 of the levers 58 are pivotally attached to the sleeve 55 and then opposite ends are attached to a staitonary collar 60 on the governor shaft 56.

The governor is not connected directly to the plug 8 because it is not used to control the position of plug 8 but to control the vacuum applied to diaphragm 12 which does control it.

The outer annular surface 62 of the sleeve 55 is frusto-conical. A brush 63, pivotally attached to case 51 at 64, bears on this conical surface by pressure afforded by spring 65. A valve plug 66 is pivotally attached to the brush 63 at 67 and closes on a seat 68 in tube 69 which is attached to a T fitting 70. The side opening of this fitting leads to and is attached to the engine intake manifold to provide vacuum in the tube 71.

Figure 4:
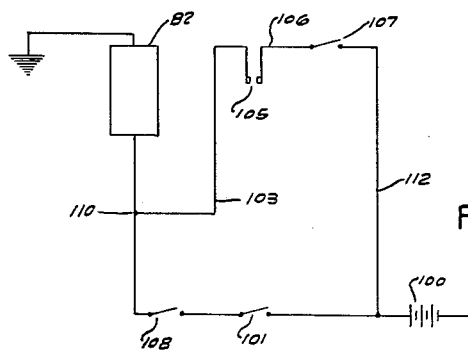
FIGURE 4 is an electrical diagram showing the connections of the various parts of the device to the electrical system of an automobile in which the device is installed.

Referring to FIGURE 4:

On the body of the solenoid 82 there is a switch 105. This switch is connected in circuit with the solenoid 82 by the conductor 103 and the leads 106 and 112. From this switch a lead is connected to the stop light side of the stop light switch 107 on the brake pedal. A contact finger 111 on the switch 105 is normally urged down by the resilience in the switch arm 104. This finger, however, is positioned to open the switch when contact is made between the finger of the switch and the shoulder 113 on plug 8, when plug 8 is moved inwardly and away from lug 7. In use, after the vacuum and electrical device has been installed in the proper position so that plug 8 abuts lug 7, wiring of the device to the control device on the dash is made by connecting the live end 110 of the solenoid to a contact button 108 and through the ignition switch 101 to the live post of the battery 100. It is to be understood that the other post of the battery is grounded. A second connecting wire is connected from the live end of the solenoid winding through connector wire 103 to switch 105 and thence to the stop light switch on the automobile. From the stop light switch the connecting wire 112 leads to the live post of the battery.

When the operator wishes to put the speed control in service he rotates the control knob 109 to the desired indicated speed. When this is done threaded rod 27 pulls nut 20 into cylindrical casing 25, and through steel wire 31 moves plunger disc 42 in the direction to compress spring 45. When the speed of the vehicle reaches the same speed, as set, the governor is rotating at a speed that moves the fly balls out in a circular path thus moving tapered sleeve 55 axially in the direction of the fly balls. In so doing a movement is communicated through the yoke 53 and lever 50 to the stiff wire 46. This motion in wire 46 moves tubular casing 43 in a direction to compress spring 45 against disk 42. By predetermined calculation the speed indicia on the dial 109 of the dash control may be set to a desired speed, and when the governor is driven by the engine attains the desired speed a balance of forces act on disk 42; that is, the dash control compressing spring 45 balances the action of the governor compressing the spring from the other direction and disk 42 remains in a fixed position. When this balance of forces exists the valve plug 66 is so positioned as to allow enough vacuum to pass to balance the compression of spring 76 and position the diaphragm 12 approximately in the center of its case 14. When this alignment of various units prevails, the operator may press button 108 on the dash control raising armature 81 and latch 80 permitting stem 78 and plug 8 to be urged out of sleeve 77 by spring 79 until plug 8 abuts against lug 7. Releasing button 108 allows latch 80 to fall into the aligned notch on stem 78. The entire device is now in service.

When the speed of the vehicle increases the governor opens the valve plug 66 increasing the vacuum to diaphragm 12 which overcomes the compression of spring 76. Thus the diaphragm 12 moves to close the throttle and slow the vehicle. If the speed of the vehicle decreases the governor closes the valve plug 66 decreasing the vacuum to the diaphragm 12 and the spring 76 expands to move the diaphragm 12 in the direction to open the throttle.

Should the operator now wish to disconnect the device from service it is only necessary to either press button 108 or press the brake pedal 110a sufficient to close stop light switch 107 to energize the solenoid 82. When solenoid 82 is energized and latch 80 is raised, the force of spring 79 is overcome by the urge of throttle return spring 6 having a tension to close the throttle so stem 78 is moved into sleeve 77 and plug 8 moved in the same direction. The stem 78 is now positioned so that the shoulder of plug 8 abuts against the end of sleeve 77 and latch 80 has dropped into the front notch on stem 78. As the vehicle now slows its speed the governor closes the valve plug 66 shutting off the vacuum and allowing spring 76 to force diaphragm 12, sleeve 77, and plug 8 as far forward as the travel of the diaphragm 12 will allow. With plug 8 and diaphragm 12 in this position plug 8 is not long enough to prevent the throttle from returning to the normal idle position.

In this position the shoulder on plug 8 has contacted the finger 111 on the switch arm 104 raising it up and opening the switch 105. Therefore, all current from the battery is disconnected and no current flows through the solenoid after the stop light switch 107 on the brake pedal is operated even though the stop light switch is operated repeatedly, because switch 105 has opened thus preventing current from flowing to the solenoid winding. This is a safety feature to prevent waste of current and the possibility of burning out the solenoid winding by the unintentional flow of current through the solenoid when the stop light switch is closed.

The device may be used as a fixed throttle control. Using the device in this manner, of course, does not make allowances for variations in the inclination of the road or for windages. To use the device in this manner, the dash control knob 109 is turned to its limit thus holding the governor fly balls in their smallest circular path and shutting off all vacuum to the diaphragm 12. The plug 8 may be set in the usual manner by pressing button 108 and energizing solenoid 82. The throttle will remain in the set position as long as the speed of the vehicle does not exceed the top speed setting on dash control knob 109, the brake pedal is not pressed, or button 108 is not pressed.

To prevent surges or hunting, auxiliary vacuum chamber 90 is connected to pipe 69 through a tube 91 and small adjustable valve 92. This will tend to even the air pressure and vacuum pressure applied to diaphragm 12.

The position of the plug 8 in relation to sleeve 77 and diaphragm 12 is, in turn, determined by the position of any one of the slots 83 into which the latch 80 on armature 81 is dropped and engaged.

From the setting on the dash, therefore, the balancing of forces tends to maintain plug 8 in a position to hold the lug 7 and consequently push rod 5 at a position to hold a constant speed.

When the apparatus is in this condition the operator can push on the throttle accelerator to speed up the automobile momentarily, such as to pass another car, but he cannot decelerate beyond the fixed position of the lug 7 without disconnecting the apparatus. This can be easily done by pushing on push button switch 108 in the center of the knob 109. This push button switch energizes solenoid 82 and releases the plug 8 from its advanced position where it contacts lug 7. By this simple and convenient switch the apparatus can be rendered inoperative and the automobile will function as though it were not installed.

However, with the apparatus set in connected position and held by the latch 80 on stem 78, the automobile will continue to travel at the speed at which it was operating when the device was set by releasing latch 80 with the diaphragm 12 controlled by the speed of the car, by the vacuum admitted into compartment 75 and by the control of the dial setting on knob 109.

For convenience of definition, the devices in cylindrical container 40 may be known as a variable strain compensator. The compression of spring 45 is varied by the push or pull adjustment of wire 31. These adjusting movements are resiliently communicated to lever 50 thru wire 46. Adjusting movement of wire 31 could not be directly communicated to lever 50 because it is continually moving as governor sleeve 55 moves on shaft 56.

In case 14 diaphragm compression spring 76 offsets, to some extent, the urge of plug extending spring 79, and also holds the center of the diaphragm 12 against the urge of vacuum in chamber part 75. The movement of diaphragm 12 is thus dependent on the balancing of opposing forces; spring 76 pushing to the right against spring 79 and vacuum tending to draw or urge the diaphragm 12 to the left. The movement of the diaphragm moves sleeve 77, plug 8 and lug 7 when the lug is extended as above explained to bear on lug 7.

I claim:

1. A constant speed keeper for an automobile having an intake manifold, a carburetor, including a throttle and a throttle valve control rod, a drive shaft and a dashboard in the driver's compartment, mechanism for maintaining the engine at a constant predetermined desired speed comprising a governor mechanism driven from the automobile drive shaft, a diaphragm in a case connected to the engine intake manifold, a sleeve secured to said diaphragm, a plug having a stem resiliently operative in said sleeve, a lug on said throttle valve rod adapted to be contacted and held toward open throttle position by said plug, electro-magnetic means on said sleeve for holding the position of said plug as it extends from said sleeve toward said lug, a valve operating between said diaphragm and said manifold having a valve plug opened and closed by said governor, a manual speed selecting knob on the automobile dash and connected through a resilient compensator sleeve to said governor to position the speed operating responsive range of said governor, electric switch means on said knob for operating said electromagnetic latching means on said diaphragm sleeve to vary the longitudinal position of the plug stem within said sleeve.

2. In an automobile having an engine with an intake manifold, a carburetor with a throttle valve, a throttle valve control rod, a spring normally urging said throttle valve to closed position, a drive shaft and an instrument panel in a driver's compartment, and adjustable constant speed keeper comprising a governor mechanism having a shaft driven from said drive shaft and having centrifugal fly balls operating a sleeve with a semi-conical outer surface and slideable on said governor shaft, an adjusting screw and nut having an indexed knob disposed on the instrument panel in the driving compartment of said automobile and operating thru a resilient strain transmitting means to urge said sleeve to vary its longitudinal position of said governor shaft, a diaphragm operating in a case connected to a plug which bears on a lug on the carburetor throttle valve control rod to hold said throttle valve in predetermined opened position, a chamber in said case connected thru a controlling needle valve to the intake manifold of the engine of said automobile, a brush disposed on the conical surface of the sleeve of said governor and connected to the said controlling needle valve to open said valve as the governor speed increases and thereby increase vacuum on said diaphragm to move said plug away from said lug and permit said throttle valve to move toward closed position, means for varying the position of said plug relative to said lug on said throttle valve control rod comprising a sleeve attached to said diaphragm, a stem on said plug slidably operating in said sleeve and having a plurality of transverse notches, a spring normally urging said plug toward said lug, a latch operative on said sleeve and controlled by an electromagnetic solenoid having a winding included in circuit with a source of electric energy on said automobile, said latch normally engaging any one of said notches and said solenoid disposed to lift said latch to non-engaging position when energized.

3. The apparatus described in claim 2 in combination with a depressable brake pedal on said automobile, a normally open contact switch on said brake disposed to close when said brake is depressed, said switch being included in circuit with said solenoid winding and said source of electrical energy.

4. The apparatus described in claim 2 in combination with a normally open push button switch whose actuating member is centrally disposed relative to an adjusting screw nut on the panel in said driving compartment of said automobile, said switch being included in circuit with said solenoid winding and said source of electrical energy.

5. In the apparatus described in claim 2, a safety switch comprising a pair of normally closed contacts on the sleeve on said diaphragm disposed to open by contact with said plug when the stem of said plug is withdrawn into said sleeve; said contacts being included in series with said solenoid winding, source of electrical energy, and an energizing switch on said automobile.

References Cited in the file of this patent
UNITED STATES PATENTS

| | | |
|---|---|---|
| 2,236,145 | Kolb | Mar. 25, 1941 |
| 2,432,166 | Mallory | Dec. 9, 1947 |
| 2,948,271 | Ignatjev | Aug. 9, 1960 |
| 2,966,224 | Teetor | Dec. 27, 1960 |